United States Patent
Kusumi

(10) Patent No.: US 10,810,714 B2
(45) Date of Patent: Oct. 20, 2020

(54) IMAGE RESTORATION PROCESSING UTILIZING SETTINGS FOR IMAGE CORRECTION

(71) Applicant: CANON KABUSHIKI KAISHA, Tokyo (JP)

(72) Inventor: Yuichi Kusumi, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 16/100,112

(22) Filed: Aug. 9, 2018

(65) Prior Publication Data

US 2019/0057494 A1 Feb. 21, 2019

(30) Foreign Application Priority Data

Aug. 15, 2017 (JP) .................................. 2017-156780

(51) Int. Cl.
G06T 5/00 (2006.01)
G06T 5/20 (2006.01)
H04N 1/58 (2006.01)
H04N 1/48 (2006.01)

(52) U.S. Cl.
CPC .............. G06T 5/20 (2013.01); G06T 5/006 (2013.01); H04N 1/486 (2013.01); H04N 1/58 (2013.01); *G06T 2207/20024* (2013.01)

(58) Field of Classification Search
CPC . G06T 5/20; G06T 5/006; G06T 2207/20024; H04N 1/486; H04N 1/58
See application file for complete search history.

(56) References Cited

U.S. PATENT DOCUMENTS

| 2005/0122400 A1* | 6/2005 | Kochi | H04N 5/217 348/207.99 |
| 2015/0219454 A1* | 8/2015 | Keranen | G01N 21/57 356/4.07 |
| 2016/0027155 A1* | 1/2016 | Naruse | H04N 1/409 382/167 |

FOREIGN PATENT DOCUMENTS

| JP | 2011-259314 A | 12/2011 |
| JP | 2012-003454 A | 1/2012 |
| JP | 2013-038563 A | 2/2013 |
| JP | 2014-27570 A | 2/2014 |
| JP | 5414752 B2 | 2/2014 |
| JP | 2015-115918 A | 6/2015 |
| JP | 2015-138470 A | 7/2015 |
| JP | 2016-80546 A | 5/2016 |
| WO | 2011/121761 A1 | 10/2011 |

* cited by examiner

*Primary Examiner* — Pakee Fang
(74) *Attorney, Agent, or Firm* — Canon U.S.A., Inc. IP Division

(57) ABSTRACT

An image processing method includes acquiring a captured image that has been generated by imaging through an imaging optical system inclined relative to an imaging plane, acquiring inclination information of the imaging optical system, acquiring aberration information of the imaging optical system, and performing image restoration processing on the captured image based on the aberration information. The image restoration processing includes a setting of a correction amount of the captured image according to the inclination information.

15 Claims, 9 Drawing Sheets

IMAGE RESTORATION PROCESSING UTILIZING SETTINGS FOR IMAGE CORRECTION

BACKGROUND

Field of the Disclosure

The present disclosure relates to an image processing method for performing image restoration processing of a captured image.

Description of the Related Art

Japanese Patent No. 5414752 discusses a method for performing image restoration processing by reconfiguring an optical transfer function of an imaging optical system according to each position (position with respect to a screen center or an optical axis of the imaging optical system in one direction) in a captured image from coefficient data corresponding to an imaging condition of the captured image. The optical transfer function at each of the positions in the captured image is rotated and developed around the optical axis of the imaging optical system for use, which makes it possible to perform the image restoration processing rotationally symmetrical about the center of an imaging plane (screen center) or the optical axis while reducing an information amount.

An imaging apparatus that uses an imaging optical system including a tilt mechanism to perform tilt imaging has been known. In the tilt imaging, distortion due to perspective can be corrected by controlling an object plane to be focused thereon. The tilt imaging is imaging in which the imaging optical system is inclined (tilted) relative to the imaging plane, and it enables an entire object plane having a depth to be in focus without increasing a depth of field, and enables a reduction of an in-focus range.

In the imaging optical system including the tilt mechanism, unlike a typical optical system rotationally symmetrical about the optical axis, image forming performance rotationally symmetrical about the center of the imaging plane or the optical axis is not necessarily obtainable. In other words, rotationally asymmetrical eccentric aberration occurs in an image height direction with respect to the center of the imaging plane or the optical axis, and the image forming performance is deteriorated compared with a reference state (not tilted).

When the image restoration processing rotationally symmetrical about the center of the imaging plane or the optical axis is performed on a deteriorated image, which is deteriorated due to the rotationally asymmetrical aberration, obtained in the tilt imaging using the method discussed in Japanese Patent No. 5414752, an adverse effect such as insufficient correction, excessive correction, edge fall (undershoot), and ringing occurs because of a difference in aberration to be corrected. Japanese Patent No. 5414752, however, does not discuss a measure against the adverse effect in a case where deterioration occurs due to the rotationally asymmetrical aberration in the tilt imaging. In addition, the optical transfer function corresponding to all positions in the screen can be used in order to perform the image restoration processing for the rotationally asymmetrical aberration. However, the information amount is increased.

SUMMARY

The present disclosure is directed to an image processing method, an image processing apparatus, an imaging apparatus, and a medium capable of performing, on an image obtained by tilt imaging, image restoration processing suppressing an adverse effect while reducing an information amount.

According to an aspect of the present invention, an image processing method includes acquiring a captured image that has been generated by imaging through an imaging optical system inclined relative to an imaging plane, acquiring inclination information of the imaging optical system, acquiring aberration information of the imaging optical system, and performing image restoration processing on the captured image based on the aberration information. The image restoration processing includes a setting of a correction amount of the captured image according to the inclination information.

Further features of the present invention will become apparent from the following description of exemplary embodiments with reference to the attached drawings.

DESCRIPTION OF THE EMBODIMENTS

Figure 1:
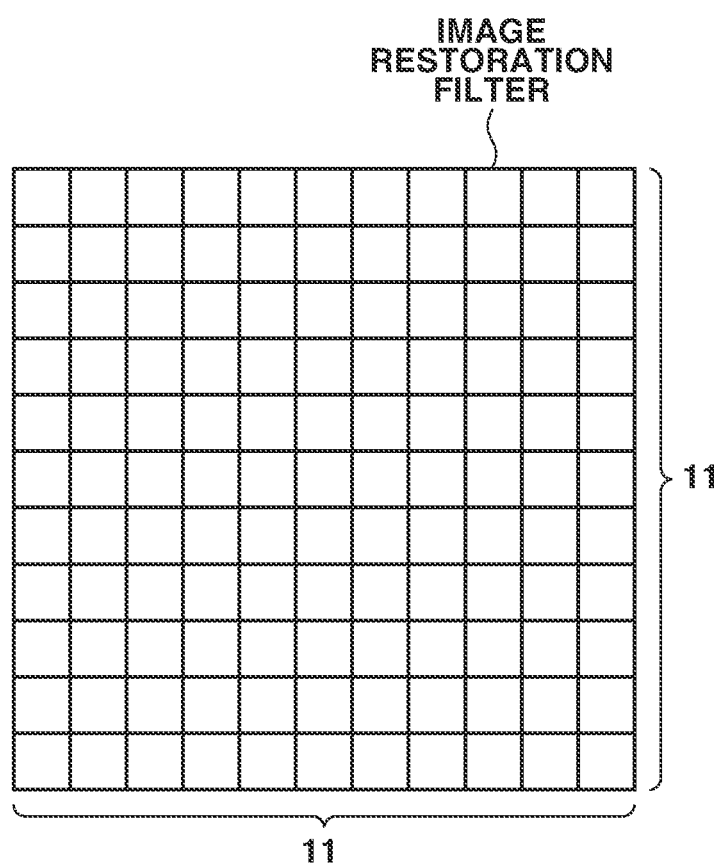
FIG. 1 is a diagram illustrating an image restoration filter according to each of exemplary embodiments.

Exemplary embodiments of the present invention are described in detail below with reference to the drawings.

A captured image obtained by an imaging apparatus includes a blur component due to influence of aberration such as spherical aberration, comatic aberration, curvature of field, and astigmatism of an imaging optical system and thus the image quality thereof is deteriorated. The blur component of the image due to such aberration indicates that an optical flux that is emitted from one point of an object and that is to be essentially collected again at one point of an imaging plane if there is neither aberration nor influence of diffraction is spread. The blur component is represented by a point spread function (PSF).

An optical transfer function (OTF) that is obtained by performing Fourier transform on the PSF is frequency component information of the aberration and is represented in a complex number. An absolute value of the OTF, i.e., an amplitude component, is referred to as a modulation transfer function (MTF), and a phase component is referred to as a phase transfer function (PTF). The MTF (amplitude component) and the PTF (phase component) are respectively frequency characteristics of the amplitude component and the phase component of image quality deterioration due to the aberration, and are represented by the following expression with the phase component as a phase angle.

$$PTF = a\tan(Im(OTF)/Re(OTF))$$

In the expression, Re(OTF) and Im(OTF) respectively denote a real part and an imaginary part of the OTF. As described above, since the OTF of the imaging optical system causes deterioration of the MTF (amplitude component) and the PTF (phase component) of the image, the deteriorated image is in a state where points of the object are asymmetrically blurred as with the comatic aberration. In addition, magnification chromatic aberration occurs when an image forming position is shifted due to a difference of image forming magnification between wavelengths of light, and the magnification chromatic aberration is generated by acquiring image forming positions as, for example, red, green, and blue (RGB) color components according to a spectral characteristic of the imaging apparatus. Accordingly, the image forming positions are shifted between RGB, and image spreading occurs in each of the color components due to the difference of the wavelengths thereof, i.e., a phase shift.

As a method for correcting the deterioration of the MTF (amplitude component) and the PTF (phase component), a correction method using aberration information (OTF or PSF, and information relating thereto) of the imaging optical system is known. The method is referred to as image restoration or image recovery. Hereinafter, processing for correcting deterioration of the captured image with use of the aberration information of the imaging optical system is referred to as image restoration processing. As one of image restoration methods, a method for convolving the captured image with an image restoration filter having an inverse characteristic of the OTF is known, and a detail thereof is described below.

To effectively use the image restoration, it is necessary to obtain accurate information of the OTF of the imaging optical system. The OTF of a typical imaging optical system largely varies with an image height (position of image). In addition, the OTF is two-dimensional data constituted of a complex number, which includes a real part and an imaginary part. In a case where the image restoration processing is performed on a color image including color components of three colors RGB, the OTF at one image height includes the number of taps in a vertical direction×the number of taps in a horizontal direction×2 (real part and imaginary part)×3 (RGB). In the present disclosure, the number of taps indicates a vertical size and a horizontal size of the OTF. If such taps are held for all imaging conditions such as an image height, an F-number (aperture value), a zoom position (focal length), and an image taking distance, a data amount becomes huge. Therefore, in an exemplary embodiment, a method and a configuration for reducing the data amount (information amount) are described.

First, a definition of terms described in the present exemplary embodiment and the image restoration processing (image processing method) are described. The image processing method described herein is appropriately used in each of exemplary embodiments described below.

<Captured Image>

A captured image is a digital image obtained by an imaging device that has received light through an imaging optical system. The captured image is deteriorated due to the OTF including aberration of the imaging optical system, which includes a lens and various kinds of optical filters. The imaging optical system may also include a mirror (reflection surface) having curvature in addition to the lens.

Color components of the captured image include, for example, information of RGB color components. In addition, a commonly-used color space such as an LCH color space expressed in lightness, chroma, and hue and a YCbCr color space expressed in luminance and a color-difference signal may also be selected and used. As the other color spaces, XYZ, Lab, Yuv, and JCh color spaces may be used. Further, color temperature may be used as well.

To a captured image (input image) and an output image, an imaging condition such as a focal length of a lens, an aperture value, and an image taking distance as well as various kinds of correction information for correcting the image may be added. In a case where the image is transferred from the imaging apparatus to another image processing apparatus to perform correction processing on the image, the imaging condition and the information relating to correction are preferably added to the captured image as described above. As another method for transferring the imaging condition and the information relating to correction, the imaging apparatus and the image processing apparatus may be directly or indirectly connected to perform the transfer.

<Image Restoration Processing>

Subsequently, an outline of the image restoration processing is described. When the captured image (deteriorated image) is denoted by g(x, y), an original image is denoted by f(x, y), and the PSF as a Fourier pair of the OTF is denoted by h(x, y), Expression (1) is established.

$$g(x,y) = h(x,y) * f(x,y) \tag{1}$$

In this expression, * indicates convolution (convolution integration, product-sum), and (x, y) indicates a coordinate on the captured image.

Expression (1) is converted into an expression in an expression of a frequency plane through the Fourier transform to obtain Expression (2) represented by a product of each frequency.

$$G(u,v) = H(u,v) \cdot F(u,v) \tag{2}$$

In this expression, H is the OTF obtained by performing the Fourier transform on the PSF (h), G and F are functions obtained by performing the Fourier transform on the deteriorated image g and the original image f, respectively, and (u, v) is a coordinate on a two-dimensional frequency plane, i.e., a frequency.

To obtain the original image f from the captured deteriorated image g, both sides of Expression (2) are divided by the OTF H as represented by Expression (3).

$$G(u,v)/H(u,v) = F(u,v) \tag{3}$$

Then, inverse Fourier transform is performed on F(u, v), or G(u, v)/H(u, v), to return F(u, v) to a real plane, and the original image f(x, y) is obtained as a restored image.

When $H^{-1}$ subjected to the inverse Fourier transform is denoted by R, convolution processing is performed on the image on the real plane as represented by Expression (4), and the original image f(x, y) is obtained in a similar manner.

$$g(x,y) * R(x,y) = f(x,y) \tag{4}$$

In this expression, R(x, y) is referred to as an image restoration filter. In a case where the image is a two-dimensional image, commonly, the image restoration filter R is also a two-dimensional filter having taps (cells) corresponding to pixels of the image. Further, restoration accuracy is typically improved as the number of taps (number of cells) of the image restoration filter R is larger. Accordingly, the number of achievable taps is set according to required image quality, image processing capacity, a characteristic of aberration, etc. It is necessary for the image restoration filter R to reflect at least the characteristic of aberration. Therefore, the image restoration filter R is different from, for example, an existing edge enhancement filter including about three taps in each of a horizontal direction and a vertical direction. Since the image restoration filter R is set based on the OTF, the image restoration filter R can correct deterioration of both of the amplitude component and the phase component with high accuracy.

Further, an actual image contains a noise component. Therefore, when the image restoration filter R that is created from an inverse of the OTF as described above is used, the noise component is significantly amplified along with restoration of the deteriorated image. This is because the MTF (amplitude component) of the optical system is raised so as to return to 1 over the entire frequency in a state where amplitude of the noise is added to the amplitude component of the image. The MTF (amplitude component), which is amplitude deterioration of the optical system, is returned to 1; however, a power spectrum of the noise is raised at the same time. As a result, the noise is amplified according to a degree of raising (restoration gain) of the MTF (amplitude component).

Accordingly, in a case where the noise is contained, an image favorable as an image for appreciation is not obtained. This is represented by Expressions (5-1) and (5-2).

$$G(u,v) = H(u,v) \cdot F(u,v) + N(u,v) \quad (5\text{-}1)$$

$$G(u,v)/H(u,v) = F(u,v) + N(u,v)/H(u,v) \quad (5\text{-}2)$$

where N is the noise component.

As for the image containing the noise component, a method for controlling a restoration degree according to an intensity ratio SNR of an image signal and a noise signal may be used, for example, as with the Wiener filter represented by Expression (6).

$$M(u, v) = \frac{1}{H(u, v)} \frac{|H(u, v)|^2}{|H(u, v)|^2 + SNR^2} \quad (6)$$

In this expression, M(u, v) is a frequency characteristic of the Wiener filter, and |H(u, v)| is an absolute value (MTF) of the OTF. In this method, the restoration gain (restoration degree) is decreased as the MTF is smaller, and the restoration gain is increased as the MTF is larger, for each frequency. Typically, since the MTF of the imaging optical system is high in a lower frequency and low in a higher frequency, the restoration gain in the higher frequency of the image is substantially reduced by this method.

Figure 2:
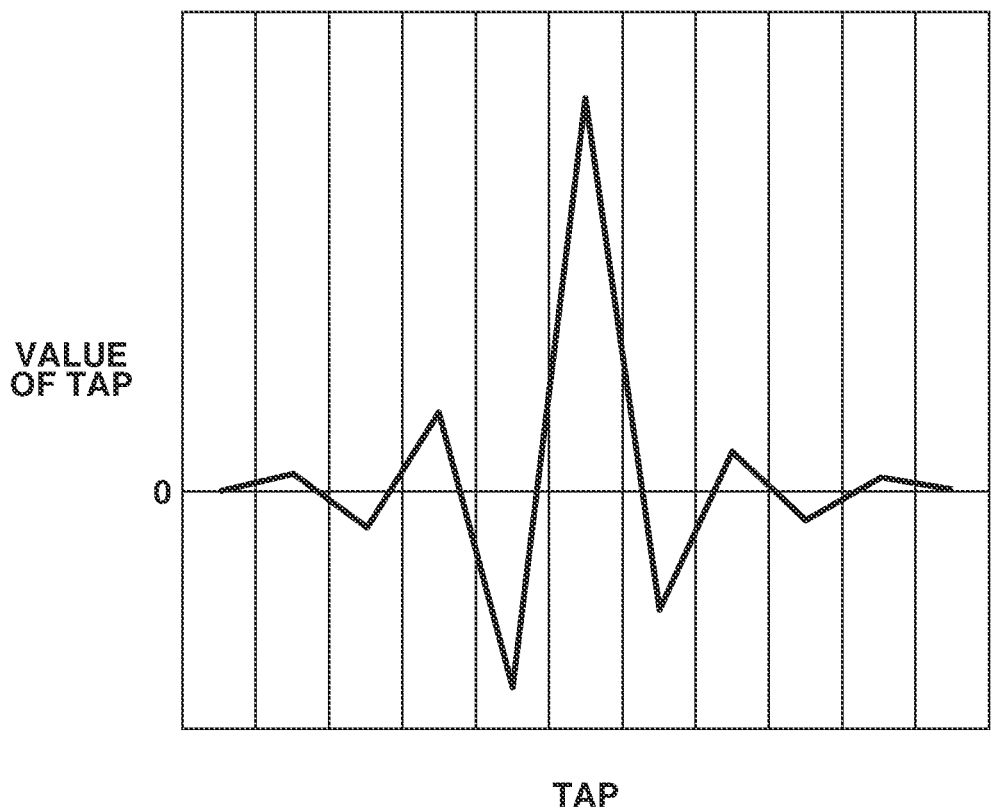
FIG. 2 is a diagram illustrating the image restoration filter according to each of the exemplary embodiments.

Subsequently, the image restoration filter is described with reference to FIGS. 1 and 2. The number of taps of the image restoration filter is determined according to an aberration characteristic of the imaging optical system and required restoration accuracy. An image restoration filter of FIG. 1 is a two-dimensional filter including 11×11 taps as an example. In FIG. 1, a value (coefficient) of each of the taps is not illustrated, and a cross-section of the image restoration filter is illustrated in FIG. 2. Distribution of the values (coefficient values) of the taps of the image restoration filter has a function of returning a signal value (PSF) spatially spread due to the aberration ideally to an original one point.

Each of the taps of the image restoration filter is subjected to convolution processing (convolution integration, product-sum) corresponding to each of the pixels of the image in a process of the image restoration processing. In the convolution processing, to improve a signal value of a predetermined pixel, the predetermined pixel is made coincident with the center of the image restoration filter. Further, a product of the signal value of the image and the coefficient value of the filter is calculated between corresponding pixels of the image restoration filter and the image, and a total sum of the products replaces a signal value of the center pixel.

Figure 3:
FIG. 3 is a diagram illustrating a point spread function PSF according to each of the exemplary embodiments.
Figure 4:
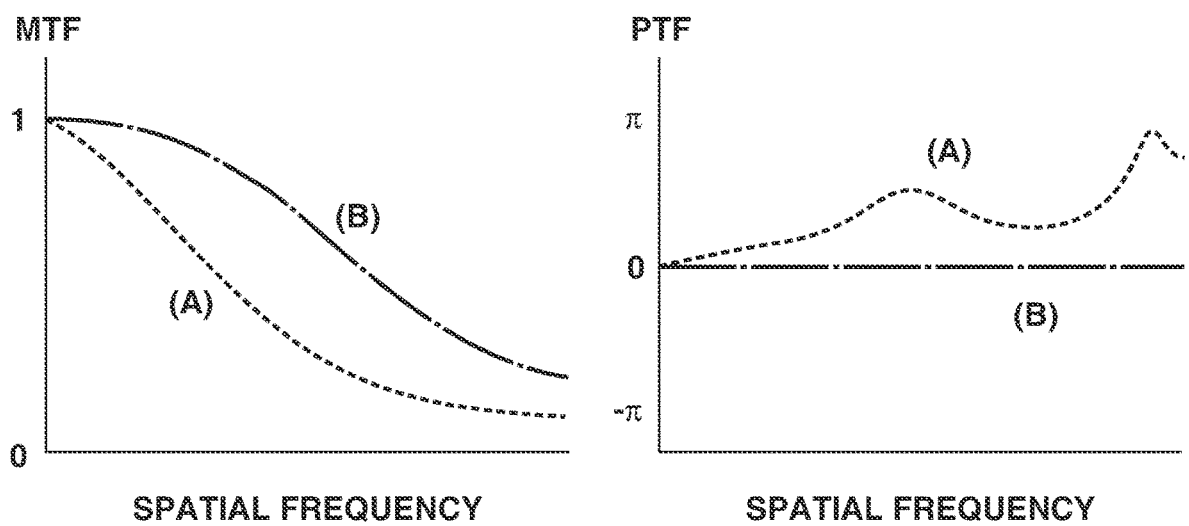
FIG. 4 is a diagram illustrating an amplitude component of an optical transfer function (OTF), i.e., a modulation transfer function (MTF) and a phase component of the OTF, i.e., a phase transfer function (PTF) according to each of the exemplary embodiments.

Subsequently, a characteristic of the image restoration in a real space and a frequency space is described with reference to FIGS. 3 and 4. FIG. 3 is an explanatory diagram of the PSF, where a left diagram of FIG. 3 illustrates the PSF before the image restoration, and a right diagram of FIG. 3 illustrates the PSF after the image restoration. FIG. 4 is an explanatory diagram of the MTF (amplitude component) (left diagram of FIG. 4) and the PTF (phase component) (right diagram of FIG. 4) of the OTF. A dashed line (A) in the left diagram of FIG. 4 indicates the MTF (amplitude component) before the image restoration, and an alternate long and short dash line (B) indicates the MTF (amplitude component) after the image restoration. Further, a dashed line (A) in the right diagram of FIG. 4 indicates the PTF (phase component) before the image restoration, and an alternate long and short dash line (B) indicates the PTF (phase component) after the image restoration. As illustrated in the left diagram of FIG. 3, the PSF before the image restoration has an asymmetrical spread, and due to the asymmetry, the PTF (phase component) has a non-linear value relative to the frequency. The image restoration processing performs correction such that the MTF (amplitude component) is amplified and the PTF (phase component) becomes zero. Therefore, the PSF after the image restoration has a symmetrical acute shape.

As described above, the image restoration filter can be obtained by performing inverse Fourier transform on the function that is designed based on the inverse function of the OTF of the imaging optical system. The image restoration filter used in the present exemplary embodiment can be appropriately changed, and for example, the Wiener filter as described above may be used. In a case of using the Wiener filter, the image restoration filter of the real space with which the image is to be actually convolved can be obtained through inverse Fourier transform of Expression (6). In addition, the OTF is varied depending on the image height (position of image) of the imaging optical system even in one imaging state. Therefore, the image restoration filter to be used is changed depending on the image height.

Figure 5:
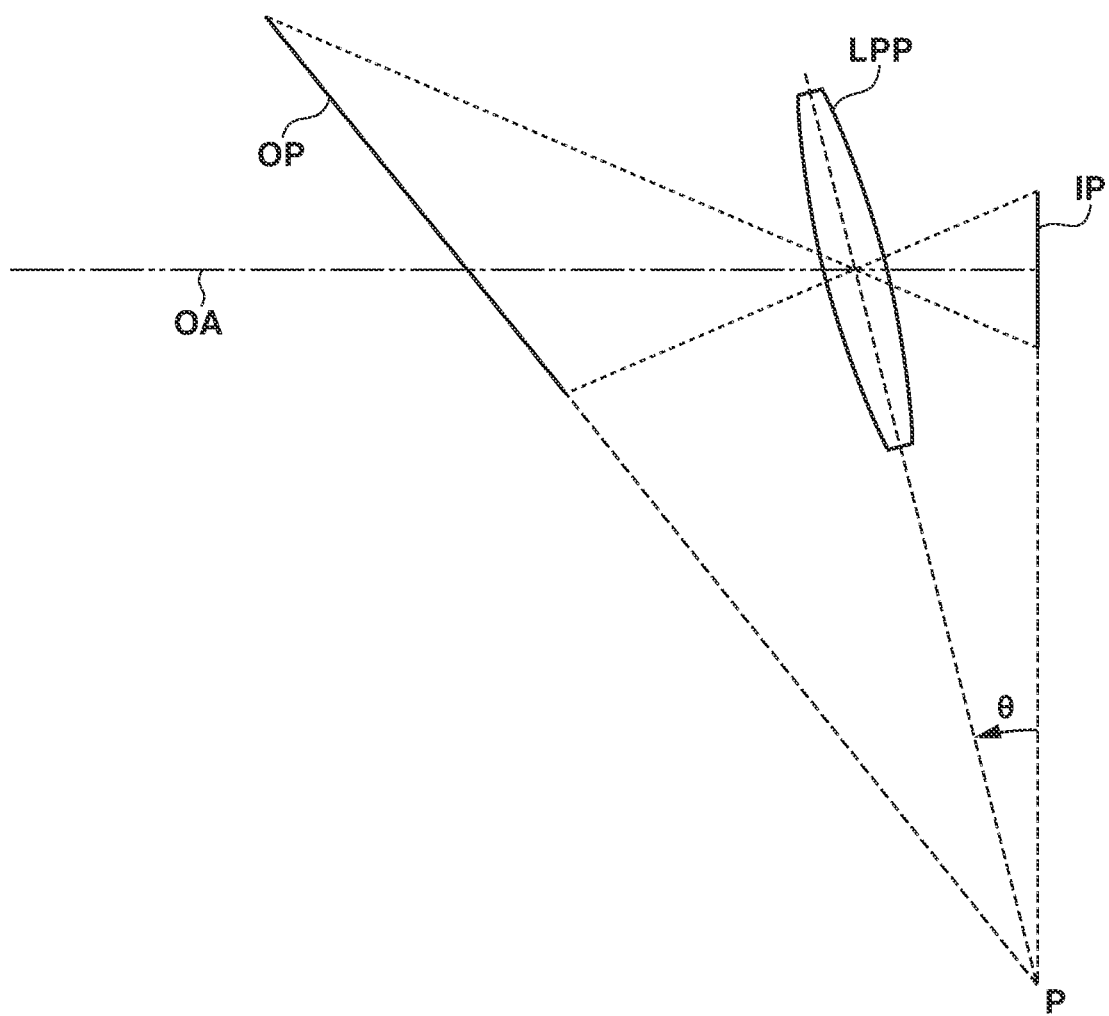
FIG. 5 is a diagram illustrating tilt imaging based on Scheimpflug principle according to an exemplary embodiment.

Next, tilt imaging according to the present exemplary embodiment is described with reference to FIG. 5. FIG. 5 is an explanatory diagram of the tilt imaging based on the Scheimpflug principle. In the tilt imaging, the imaging optical system is inclined (tilted) relative to the imaging plane, which causes a principle plane LPP of the imaging optical system to be inclined relative to an imaging plane IP. In other words, the captured image according to the present exemplary embodiment is an image acquired in a state where the principle plane LPP of the imaging optical system is inclined relative to the imaging plane IP of the imaging device.

At this time, an object plane OP on which the imaging optical system is focused, the principle plane LPP of the imaging optical system, and the imaging plane IP intersect with one another on a straight line P. In such tilt imaging, the object plane OP to be focused thereon is inclined relative to the imaging plane IP, which makes it possible to control an in-focus range irrespective of an aperture value (F-number)

of the imaging optical system. For example, it enables the entire object plane OP having a depth to be in focus without reducing an aperture value to increase a depth of field. In contrast, extremely narrowing the in-focus range allows for diorama-like image representation.

The tilt imaging can be achieved by providing a tilt mechanism on the imaging optical system. Further, the imaging optical system may include a revolving mechanism that makes a tilt direction variable. In the tilt imaging, eccentric aberration occurs because the object plane OP, the principle plane LPP of the imaging optical system, and the imaging plane IP are not parallel to one another. The eccentric aberration refers to an eccentric coma (eccentric comatic aberration), eccentric distortion, a color shift caused by eccentricity, and the like. Such eccentric aberration in the tilt imaging occurs as aberration rotationally asymmetrical about the center of the imaging plane IP or an optical axis OA of the imaging optical system.

Figure 6:
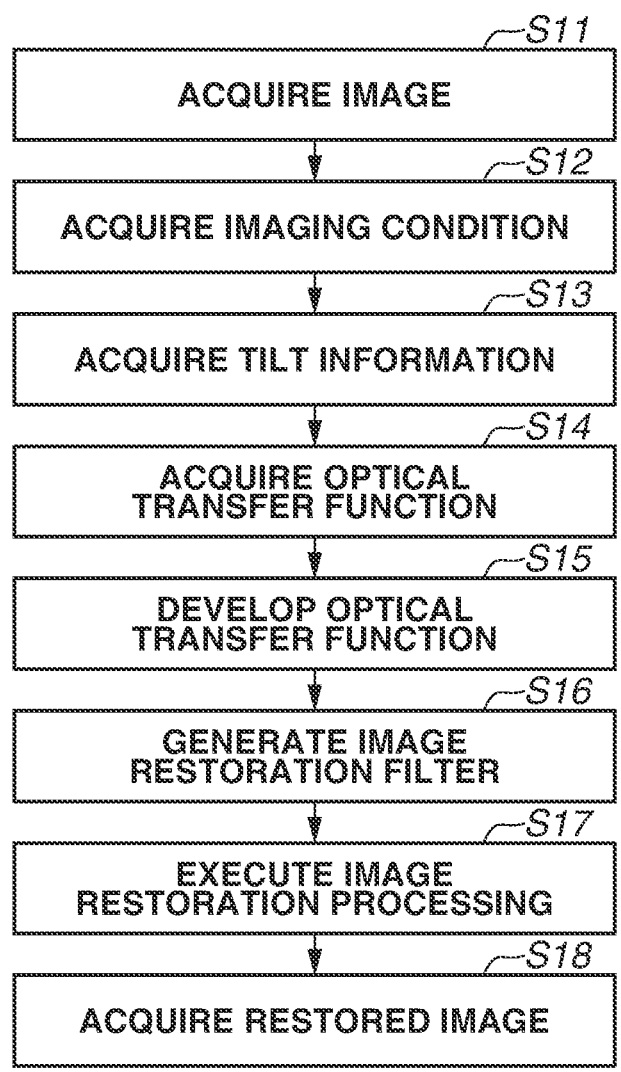
FIG. 6 is a flowchart illustrating an image processing method according to a first exemplary embodiment.

Next, the image processing method according to a first exemplary embodiment of the present invention is described with reference to FIG. 6. FIG. 6 is a flowchart of the image processing method (image processing program) according to the present exemplary embodiment. The image processing method according to the present exemplary embodiment is executed by a computer, which includes a central processing unit (CPU) and the like, as the image processing apparatus according to the image processing program as a computer program. This also applies to other exemplary embodiments described below.

First, in step S11, the image processing apparatus acquires the captured image that has been generated by the imaging apparatus through imaging. The captured image may be acquired from the imaging apparatus through wired or wireless communication between the imaging apparatus and the image processing apparatus or through a storage medium such as a semiconductor memory and an optical disk. Next, in step S12, the image processing apparatus acquires an imaging condition (imaging condition information) at a time when the imaging apparatus generates the captured image through the imaging. As described above, the imaging condition includes identification information (camera identification (ID)) of the imaging apparatus in addition to the focal length, the aperture value (F-number), and the image taking distance of the imaging optical system. In addition, in the imaging apparatus in which the imaging optical system is interchangeable, the imaging condition may also include identification information (lens ID) of the imaging optical system (interchangeable lens). The imaging condition information may be acquired as attendant information to the captured image as described above or may be acquired through wired or wireless communication or a storage medium.

Subsequently, in step S13, the image processing apparatus acquires information indicating a state of the tilt imaging (i.e., information indicating a tilt state of the imaging optical system) at the time when the imaging apparatus generates the captured image through the imaging. In acquiring the information indicating the state of the tilt imaging, the image processing apparatus first determines whether the imaging apparatus has performed the tilt imaging, i.e., whether the imaging optical system has been tilted relative to the imaging plane. In a case where it is determined as the tilt imaging, the image processing apparatus acquires information relating to a tilt direction (inclination direction) and a tilt angle (inclination angle) relative to the imaging plane of the imaging optical system in the tilt imaging state. The tilt direction and the tilt angle are respectively illustrated by an arrow and θ in FIG. 5. Hereinafter, the information indicating the state of the tilt imaging is referred to as tilt information. The tilt information may be acquired as attendant information to the captured image or may be acquired through wired or wireless communication or a storage medium as with the above-described imaging condition information.

Subsequently, in step S14, the image processing apparatus acquires aberration information suitable for the imaging condition. In the present exemplary embodiment, the aberration information is the OTF. The image processing apparatus selects and acquires, from the plurality of OTFs held in advance, a suitable OTF according to the imaging condition. In addition, in a case where the imaging condition such as the aperture value, the image taking distance, and the focal length of the zoom lens is a specific imaging condition, an OTF corresponding to the specific imaging condition may be generated through interpolation processing from the OTFs of the other imaging conditions held in advance. In this case, it is possible to reduce the data amount of the OTFs to be held. As the interpolation processing, for example, bilinear interpolation (linear interpolation) and bicubic interpolation are used; however, the interpolation processing is not limited thereto.

In the present exemplary embodiment, the image processing apparatus acquires the OTF as the aberration information; however, the aberration information is not limited thereto. The image processing apparatus may acquire the aberration information such as the PSF in place of the OTF. Moreover, in the present exemplary embodiment, the image processing apparatus may acquire approximated coefficient data through fitting the aberration information to a predetermined function, and may reconfigure the OTF and the PSF based on the coefficient data. For example, the OTF may be fitted with use of the Legendre polynomial. In addition, the OTF may be fitted with use of another function such as the Chebyshev polynomial.

In step S14, the image processing apparatus (OTF acquisition unit) generates the plurality of OTFs in one direction that passes through the screen center (center of the captured image) or the optical axis OA of the imaging optical system and is perpendicular to the optical axis OA. The imaging optical system may include an imaging device, an optical low pass filter, etc.

Subsequently, in step S15, the image processing apparatus (OTF development unit) rotates the OTFs around the screen center (center of the captured image) or the optical axis OA of the imaging optical system to develop the OTFs. More specifically, the image processing apparatus interpolates the OTFs corresponding to a pixel array to discretely dispose the OTFs to a plurality of positions in the captured image.

Subsequently, in step S16, the image processing apparatus (image restoration filter generation unit) converts the OTFs into the image restoration filters (filters). In other words, the image processing apparatus generates the image restoration filters with use of the developed OTFs. The image restoration filter is generated by creating a restoration filter characteristic in the frequency space based on the OTF and by converting the restoration filter characteristic in the frequency space into a filter (image restoration filter) in the real space through inverse Fourier transform.

Figure 7A:
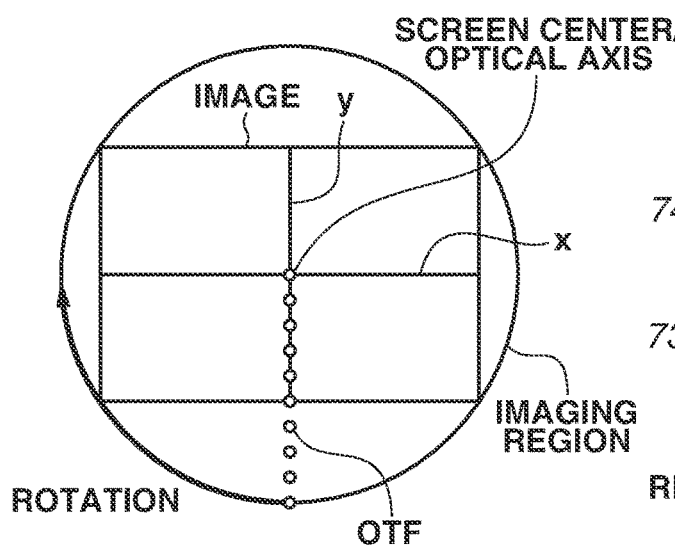
FIGS. 7A to 7E are diagrams illustrating a method for generating an image restoration filter according to the first exemplary embodiment.

Steps S15 and S16 are described in detail with reference to FIGS. 7A to 7E. FIGS. 7A to 7E are explanatory diagrams of the method for generating the image restoration filter. As illustrated in FIG. 7A, the OTFs are disposed in one direction (vertical direction) that passes through the screen center (center of the captured image) or the optical axis OA of the imaging optical system and is perpendicular to the optical axis OA within a region of a circumscribed circle of the image (imaging region).

In the present exemplary embodiment, in step S14 of FIG. 6, the OTFs are developed on a straight line as illustrated in FIG. 7A; however, the development is not limited thereto. For example, in the captured image plane, straight lines that pass through the center of the captured image or the optical axis OA of the imaging optical system and are orthogonal to each other are referred to as a first straight line (y in FIG. 7A) and a second straight line (x in FIG. 7A). At this time, it is sufficient for at least two of the OTFs acquired in step S14 to correspond to positions (image height) on the first straight line. In other words, the OTFs do not have to be linearly disposed in one direction as long as the OTFs are disposed at a plurality of positions (plurality of positions within the captured image) arranged in a predetermined direction at different distances from the screen center or the optical axis OA of the imaging optical system. In a case where a pixel including the center of the captured image or the optical axis OA of the imaging optical system does not exist, i.e., in a case where the center of the captured image or the optical axis OA of the imaging optical system is located between pixels, it is sufficient for the OTFs acquired in step S14 to correspond to the positions (image height) of the pixels interposing the first straight line.

Further, in a case where the OTFs are arranged in one direction, the direction is not limited to the vertical direction, and the OTFs may also be arranged in another direction such as a horizontal direction. The OTFs are preferably linearly arranged in any of the vertical direction and the horizontal direction because the image processing according to the present exemplary embodiment can be more easily performed.

Figure 7C:
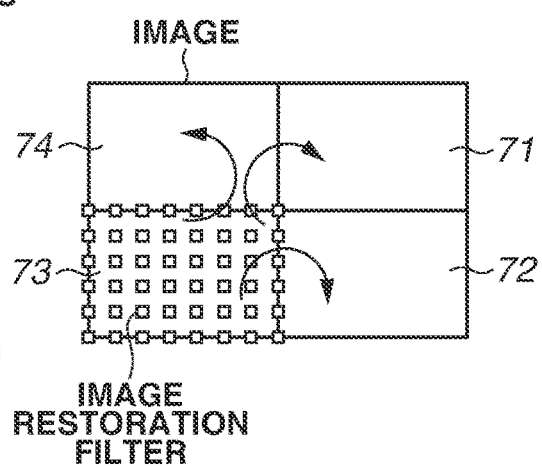
Figure 7B:
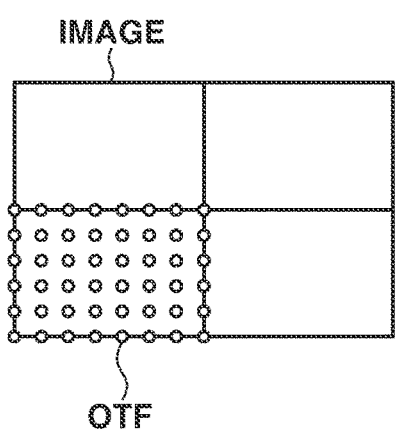

Subsequently, the OTFs are rotated, and the interpolation processing (various kinds of processing according to pixel arrangement after rotation) is performed as necessary to rearrange the OTFs as illustrated in FIG. 7B. The interpolation processing includes interpolation processing in a radiation direction and interpolation processing associated with the rotation, and allows for rearrangement of the OTFs at arbitrary positions. Next, for example, the frequency characteristic of the image restoration filter is calculated as represented by Expression (6), and inverse Fourier transform is performed on the OTF at each position to perform conversion into the image restoration filter in the real space as illustrated in FIG. 7C.

Figure 7D:
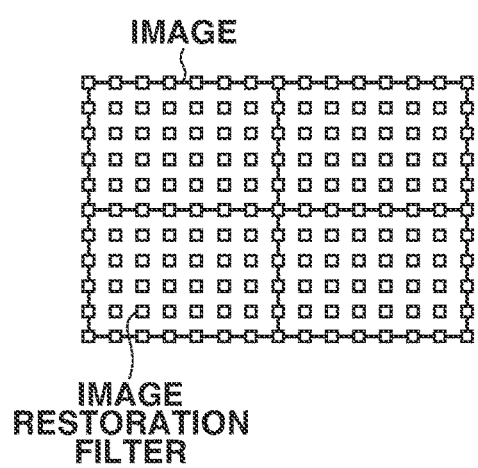
Figure 7E:
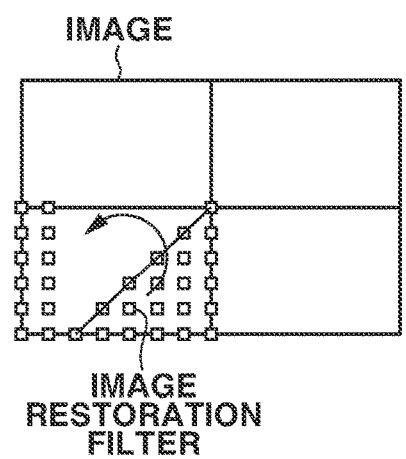

In other words, in the captured image, the straight lines that pass through the center of the captured image or the optical axis OA of the imaging optical system and are orthogonal to each other are referred to as the first straight line y in FIG. 7A and the second straight line x in FIG. 7A. A region point-symmetrical to a first region 73 of the captured image in FIG. 7C about the center of the captured image or the optical axis OA of the imaging optical system is referred to as a second region 71 in FIG. 7C. Further, a region line-symmetrical to the first region 73 about the first straight line y is referred to as a third region 72 in FIG. 7C, and a region line-symmetrical to the first region 73 about the second straight line x is referred to as a fourth region 74 in FIG. 7C. At this time, the OTFs of the second region 71, the third region 72, and the fourth region 74 are generated with use of the OTFs of the first region 73. As a result, an amount of Fourier transform processing is reduced to approximately ¼ of that of finally-rearranged positions. In addition, rearranging the OTFs of FIG. 7B and the image restoration filters of FIG. 7C through rotation and interpolation processing as illustrated in FIG. 7E and developing the OTFs and the image restoration filters with use of symmetry as illustrated in FIG. 7D make it possible to further reduce the amount of Fourier transform processing. The arrangement (arrangement density of the restoration filters) illustrated in FIGS. 7A to 7E are examples, and an arrangement distance may be arbitrarily set according to variation of the OTFs of the imaging optical system.

In the present exemplary embodiment, the OTFs arranged in one direction that passes through the screen center or the optical axis OA of the imaging optical system are rotated and developed on an assumption that the OTFs are rotationally symmetrical about the center of the imaging plane (screen center) or the optical axis OA of the imaging optical system. This makes it possible to perform the image restoration processing with a small amount of data. The image processing apparatus holds in advance, as the OTFs, the OTFs in one direction that passes through the screen center (center of the captured image) or the optical axis OA of the imaging optical system in a state where the imaging optical system is not tilted.

The eccentric aberration in the tilt imaging, however, occurs as aberration rotationally asymmetrical about the center of the imaging plane (screen center) or the optical axis OA of the imaging optical system. If the image restoration processing on an assumption of the rotationally symmetrical aberration according to the present exemplary embodiment is performed on the captured image deteriorated by the rotationally asymmetrical aberration in the tilt imaging, an adverse effect such as insufficient correction, excessive correction, edge fall (undershoot), and ringing occurs because the aberration to be corrected is different.

Accordingly, the image processing apparatus according to the present exemplary embodiment determines a restoration gain of the image restoration filter based on the tilt information. More specifically, the eccentric aberration is increased and a difference with the rotationally symmetrical aberration in a no-tilt state is increased as the tilt angle θ is increased. Therefore, the restoration gain is set smaller as the tilt angle θ is larger. In other words, the image processing apparatus sets a correction amount (restoration gain) to a first correction amount (first restoration gain) in a case where the tilt angle θ is a first inclination angle θ1. In addition, in a case where the tilt angle θ is a second inclination angle θ2 that is larger than the first inclination angle θ1, the image processing apparatus sets the correction amount (restoration gain) to a second correction amount (second restoration gain) that is smaller than the first correction amount. For example, the image processing apparatus sets a restoration gain A=2 cos θ for the tilt angle θ. The restoration gain A may be a maximum value, an average value, or a value at a specific frequency of the image restoration filter in the frequency space. The present exemplary embodiment is not limited thereto.

Moreover, in a case where the tilt angle θ in the imaging is equal to or larger than a set threshold, the restoration gain may be set smaller than the restoration gain corresponding to the tilt angle θ that is smaller than the set threshold. In other words, in a case where the tilt angle θ is smaller than the predetermined threshold, the image processing apparatus sets the correction amount (restoration gain) to a third correction amount (third restoration gain). In addition, in a case where the tilt angle θ is equal to or larger than the predetermined threshold, the image processing apparatus sets the correction amount (restoration gain) to a fourth correction amount (fourth restoration gain) smaller than the third correction amount.

The image processing apparatus according to the present exemplary embodiment preferably determines the restoration gain based on an aperture value (F-number). When the aperture value is increased, a rotationally symmetrical diffraction phenomenon becomes more dominant than the rotationally asymmetrical aberration in the tilt imaging. Therefore, the restoration gain is made smaller as the aperture value is smaller. In other words, in a case where the aperture value is a first aperture value, the image processing apparatus sets the correction amount (restoration gain) to a fifth correction amount (fifth restoration gain). Further, in a case where the aperture value is a second aperture value smaller than the first aperture value, the image processing apparatus sets the correction amount (restoration gain) to a sixth correction amount (sixth restoration gain) smaller than the fifth correction amount.

Alternatively, in a case where the aperture value in the imaging is larger than a minimum aperture value of the imaging optical system, the restoration gain may be set larger than the restoration gain at the minimum aperture value. In other words, in a case where the aperture value is equal to the minimum aperture value of the imaging optical system, the image processing apparatus sets the correction amount (restoration gain) to a seventh correction amount (seventh restoration gain). Further, in a case where the aperture value is larger than the minimum aperture value of the imaging optical system, the image processing apparatus sets the correction amount (restoration gain) to an eighth correction amount (eighth restoration gain) larger than the seventh correction amount.

Furthermore, in a case where the aperture value in the imaging is equal to or smaller than a set threshold, the restoration gain may be set smaller than the restoration gain corresponding to the aperture value larger than the set threshold. In other words, in a case where the aperture value is larger than the predetermined threshold, the image processing apparatus sets the correction amount (restoration gain) to a ninth correction amount (ninth restoration gain). In addition, in a case where the aperture value is equal to or smaller than the predetermined threshold, the image processing apparatus sets the correction amount (restoration gain) to a tenth correction amount (tenth restoration gain) smaller than the ninth correction amount.

Subsequently, in step S17 of FIG. 6, the image processing apparatus (image restoration unit) executes the image restoration processing of the captured image with use of the image restoration filters generated in step S16. In other words, the image processing apparatus convolves the captured image with the image restoration filters to perform the image restoration processing of the captured image. Then, in step S18, the image processing apparatus acquires a restored image based on a result of the image restoration processing in step S17.

In the present exemplary embodiment, the restoration gain of each of the image restoration filters has been determined based on the tilt information in step S16; however, the restoration gain in the image restoration processing may also be determined based on the tilt information. The restoration gain in the image restoration processing may be adjusted when a difference between the images before and after the image restoration processing is added to the image before the image restoration processing to change a ratio in acquisition of the restored image. In other words, as the tilt angle θ is larger, the ratio of the difference between the images before and after the image restoration processing to be added to the image before the image restoration processing is made small to make the restoration gain in the image restoration processing smaller. Further, the restoration gain in the image restoration processing may also be determined based on the aperture value in the above-described manner.

In the convolution of the image restoration filters, pixels at positions other than positions where the image restoration filters are disposed illustrated in FIG. 7D may be interpolated and generated with use of the plurality of filters disposed in the vicinity thereof. At this time, the image restoration filters include a first image restoration filter at a first position of the captured image and a second image restoration filter at a second position of the captured image. The first image restoration filter is generated with use of the developed optical transfer function. The second image restoration filter is generated through interpolation using the first image restoration filter. Such interpolation processing enables to change the image restoration filter, for example, for each pixel.

In the present exemplary embodiment, the case where the processing based on the inverse function of the OTF is performed as the image restoration processing to correct deterioration of the image has been described. In addition, unsharp mask processing using the aberration information may also be applied to the present exemplary embodiment . . . .

In the unsharp mask processing, a difference between an original image and an unsharp image that is obtained by applying an unsharp mask to the original image is added to or subtracted from the original image to generate a sharpened image. At this time, the PSF of the imaging optical system is used as the unsharp mask to acquire the image in which deterioration due to the aberration of the imaging optical system in the imaging has been corrected.

When the captured image is denoted by g(x, y) and a correction component is denoted by u(x, y), the corrected image f(x, y) is represented by Expression (7).

$$f(x,y)=g(x,y)+m \times u(x,y) \quad (7)$$

In Expression (7), varying a value m makes it possible to adjust the restoration degree (restoration gain) of the correction component u(x, y), i.e., the correction amount, of the captured image g(x, y). The value m may be varied according to the image height (position of the image) of the imaging optical system or may be a fixed value.

In addition, the correction component u(x, y) is represented by Expression (8).

$$u(x,y)=g(x,y)-g(x,y)*PSF(x,y) \quad (8)$$

Further, the correction component u(x, y) is represented by Expression (9) by deforming a right side of Expression (8).

$$u(x,y)=g(x,y)*(\delta(x,y)-PSF(x,y)) \quad (9)$$

In Expression (9), δ is a delta function (ideal point image). The delta function used here is data in which the number of taps is equal to that of the PSF(x, y), a tap value at the center is one, and all the other tap values are zero.

The corrected image f(x, y) is represented by Expression (10) from Expressions (7) to (9).

$$f(x,y)=g(x,y)*[\delta(x,y)+m \times (\delta(x,y)-PSF(x,y))] \quad (10)$$

In other words, the captured image g(x, y) is convolved with a part in square brackets in Expression (10) as the filter (image restoration filter) to perform the unsharp mask processing.

The PSF is varied according to the image height (position of the image) of the imaging optical system even in one imaging state. Therefore, the filter of the unsharp mask processing is also changed and used according to the image height. The restoration gain of the unsharp mask processing is also determined based on the tilt information and the aperture value as described above. Further, various improved resolution processing (resolution enhancement processing) such as super-resolution processing using the aberration information is similarly applicable.

Figure 8:
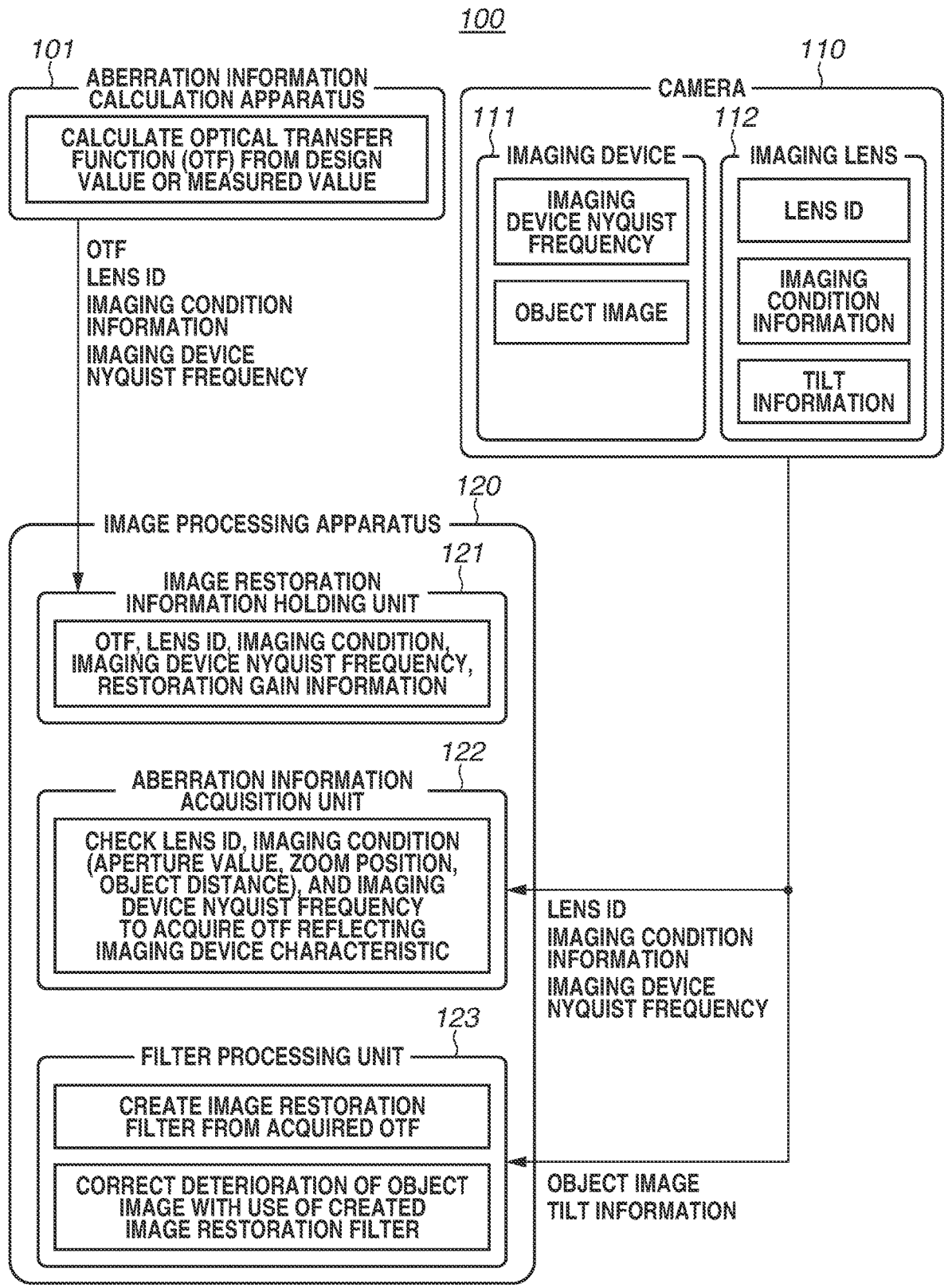
FIG. 8 is a diagram illustrating an image processing system according to a second exemplary embodiment.

Next, an image processing system including the image processing apparatus that performs the above-described image processing method is described with reference to FIG. 8. FIG. 8 is an explanatory diagram of an image processing system 100 according to a second exemplary embodiment. The image processing system 100 includes an aberration information calculation apparatus 101, a camera 110 (imaging apparatus), and an image processing apparatus 120.

The aberration information calculation apparatus 101 performs processing to calculate the OTF from a design value or a measured value of the imaging optical system according to the imaging condition of the captured image. The OTF to be calculated here is the OTF in a state where the imaging optical system is not tilted. The camera 110 includes an imaging device 111 and an imaging lens 112. The camera 110 adds, to the image captured by the imaging lens 112, a lens ID and imaging condition information (such as an aperture value, a zoom position, and an image taking distance) of the imaging lens 112, a Nyquist frequency of the imaging device 111, and tilt information, and outputs the resultant image. For example, in a case where the tilt imaging is performed (the imaging optical system includes a tilt mechanism), the tilt angle θ may be detected by an angle detector including an encoder and may be reflected in the tilt information. At this time, the tilt angle θ may be detected as a relative angle of the imaging optical system to the imaging plane. Further, a tilt direction may be detected.

The image processing apparatus 120 includes an image restoration information holding unit 121, an aberration information acquisition unit 122, and a filter processing unit (image acquisition unit and image restoration processing unit) 123. The image processing apparatus 120 holds information output from the aberration information calculation apparatus 101 and the camera 110, and uses the information to correct the deteriorated image captured by the imaging lens 112 (i.e., performs image restoration processing of the captured image).

The image restoration information holding unit 121 stores information of the OTF calculated by the aberration information calculation apparatus 101, the number of taps, the lens ID, the imaging condition, and the Nyquist frequency of the imaging device for each of combinations of the imaging lens 112 and the imaging device 111. As described above, the image restoration information holding unit 121 is a storage unit storing the OTF corresponding to the imaging condition of the captured image. Further, the image restoration information holding unit 121 stores restoration gain information based on the tilt information. Moreover, the image restoration information holding unit 121 may also store restoration gain information based on the aperture value. For example, the image restoration information holding unit 121 creates and stores, in advance, a table of a restoration gain value corresponding to the tilt angle θ and the aperture value. Alternatively, the image restoration information holding unit 121 may store information in which the restoration gain corresponding to the tilt angle θ and the aperture value is converted into a function.

The aberration information acquisition unit 122 acquires, from the camera 110, the Nyquist frequency information of the imaging device 111 and the captured image and the lens ID and the imaging condition information of the imaging lens 112. The aberration information acquisition unit 122 searches through the OTFs saved in the image restoration information holding unit 121 based on the lens ID and the imaging condition of the camera 110 used by a photographer in the imaging. Then, the aberration information acquisition unit 122 acquires a corresponding OTF (OTF suitable for the lens ID and the imaging condition in the imaging). The aberration information acquisition unit 122 acquires the OTF used by the filter processing unit 123 in the spatial frequency domain up to the Nyquist frequency of the imaging device 111 of the camera 110. In other words, the aberration information acquisition unit 122 uses the acquired OTF to acquire the OTF of the imaging optical system (imaging lens 112) corresponding to the position of the captured image. As described above, the aberration information acquisition unit 122 serves as an OTF acquisition unit that acquires the OTF of the imaging optical system corresponding to the position of the captured image. Further, the aberration information acquisition unit 122 serves as an OTF development unit that develops the OTF by rotating the OTF around the center of the captured image or the optical axis OA of the imaging optical system.

The filter processing unit 123 acquires the captured image from the camera 110. In other words, the filter processing unit 123 corresponds to an image acquisition unit. The filter processing unit 123 uses the OTF acquired by the aberration information acquisition unit 122 to create the image restoration filter for correction of deterioration of the captured image, thereby correcting deterioration of the image. In other words, the filter processing unit 123 serves as a filter generation unit that generates the image restoration filter with use of the developed OTF. Further, the filter processing unit 123 corresponds to an image restoration processing unit that performs the image restoration processing on the captured image with use of the image restoration filter. The filter processing unit 123 acquires the tilt information and the restoration gain information corresponding to the tilt angle θ and the aperture value stored in the image restoration information holding unit 121, and determines the restoration gain based on the tilt information. Alternatively, the filter processing unit 123 may determine the restoration gain based on the aperture value. In a case where the table of the restoration gain value corresponding to the tilt angle θ and the aperture value is used as the restoration gain information, the filter processing unit 123 may determine the restoration gain corresponding to the tilt information and the aperture value through interpolation of the table.

When the image restoration information holding unit 121 holds the OTF calculated in advance by the aberration information calculation apparatus 101, it is not necessary to provide the aberration information calculation apparatus 101 to a user (photographer). Further, the user may use information necessary for the image restoration processing such as coefficient data by downloading the information through a network or various kinds of storage media.

Figure 9:
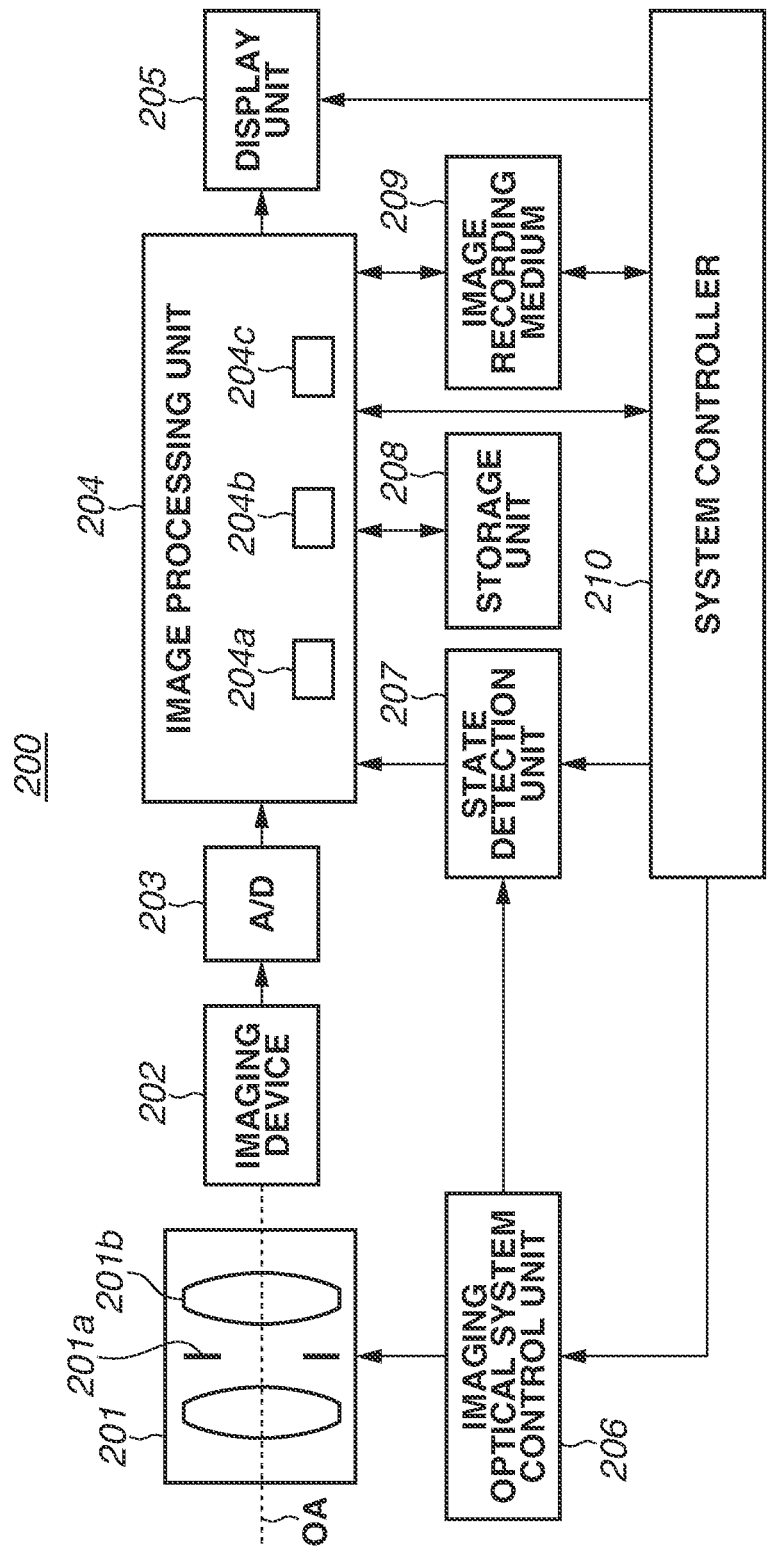
FIG. 9 is a block diagram illustrating an imaging apparatus according to a third exemplary embodiment.

Next, an imaging apparatus according to a third exemplary embodiment of the present invention is described with reference to FIG. 9. FIG. 9 is a block diagram of an imaging apparatus 200 according to the present exemplary embodiment. An image processing program that performs image restoration processing (image restoration method similar to that in the first exemplary embodiment) of the captured image is installed in the imaging apparatus 200, and the image restoration processing is executed by an image processing unit 204 (image processing apparatus) inside the imaging apparatus 200.

The imaging apparatus 200 includes an imaging optical system 201 (lens) and an imaging apparatus main body (camera main body). The imaging optical system 201 includes a tilt mechanism, a diaphragm 201a, and a focus lens 201b, and is integrally configured with the imaging apparatus main body (camera main body). However, the present exemplary embodiment is not limited thereto and is also applicable to an imaging apparatus in which the imaging optical system 201 is interchangeably mounted on the imaging apparatus main body.

An imaging device 202 photoelectrically converts an object image (optical image or image forming light) formed through the imaging optical system 201 to generate the captured image. In other words, the object image is photoelectrically converted by the imaging device 202 into an analog signal (electric signal). Then, the analog signal is converted into a digital signal by an analog/digital (A/D) converter 203, and the digital signal is input to the image processing unit 204.

The image processing unit 204 (image processing apparatus) performs predetermined processing on the digital signal and performs the above-described image restoration processing. The image processing unit 204 includes an image acquisition unit 204a, an aberration information acquisition unit 204b, and an image restoration processing unit 204c. The image acquisition unit 204a and the image restoration processing unit 204c have the function of the filter processing unit 123 according to the second exemplary embodiment. The aberration information acquisition unit 204b has the function of the aberration information acquisition unit 122 according to the second exemplary embodiment.

First, the image processing unit 204 acquires the imaging condition information of the imaging apparatus from a state detection unit 207. The imaging condition information is information relating to the aperture value (F-number), the image taking distance, the focal length of the zoom lens, and the like. The state detection unit 207 can acquire the imaging condition information directly from a system controller 210; however, the configuration is not limited thereto. For example, the imaging condition information relating to the imaging optical system 201 may be acquired from an imaging optical system control unit 206. Further, the state detection unit 207 acquires the tilt information in the imaging. The process flow (image processing method) of the image restoration processing according to the present exemplary embodiment is similar to that in the first exemplary embodiment described with reference to FIG. 6, and a description thereof is therefore omitted.

The OTF is held in a storage unit 208. The output image processed by the image processing unit 204 is saved in an image recording medium 209 in a predetermined format. A display unit 205 displays an image obtained by performing predetermined display processing on the image subjected to the image restoration processing according to the present exemplary embodiment. The image to be displayed is not limited thereto, and an image subjected to simplification processing for high-speed display may be displayed on the display unit 205.

A series of control in the present exemplary embodiment is performed by the system controller 210, and the imaging optical system 201 is mechanically driven by the imaging optical system control unit 206 in response to an instruction from the system controller 210. The imaging optical system control unit 206 controls an aperture diameter of the diaphragm 201a as an imaging state setting of the aperture value (F-number). Further, the imaging optical system control unit 206 controls a position of the focus lens 201b by an unillustrated automatic focus (AF) mechanism or an unillustrated manual focus mechanism to adjust a focus according to an object distance. Functions such as the aperture diameter control of the diaphragm 201a and the manual focus may not be executed depending on a specification of the imaging apparatus 200.

The imaging optical system 201 may include an optical device such as a low pass filter and an infrared cut filter; however, if a device such as the low pass filter that influences a characteristic of the OTF is used, some consideration is necessary at a time of creating the image restoration filter in some cases. The infrared cut filter also influences each of the PSFs of RGB channels that are integral values of the PSFs of spectral wavelengths, in particular, the PSF of the R channel. Therefore, some consideration is necessary at the time of creating the image restoration filter in some cases. In this case, as described in the first exemplary embodiment, the rotationally asymmetrical transfer function is added after the OTFs are rearranged.

In the present exemplary embodiment, the OTF stored in the storage unit 208 of the imaging apparatus is used. As a modification, the imaging apparatus may acquire the OTF stored in a storage medium such as a memory card.

As described above, in each of the exemplary embodiments, the image processing apparatus 120 (image processing unit 204) includes the filter processing unit 123 (image acquisition unit 204a and image restoration processing unit 204c) and the aberration information acquisition unit 122 (204b). The filter processing unit 123 (image acquisition unit 204a) acquires the captured image generated by the imaging through the imaging optical system that is inclined (tilted) relative to the imaging plane IP. The aberration information acquisition units 122 and 204b acquire the aberration information (restoration gain) of the imaging optical system. The filter processing unit 123 (image restoration processing unit 204c) acquires inclination information (tilt information) of the imaging optical system, and performs the image restoration processing on the captured image based on the aberration information. Further, the filter processing unit 123 (image restoration processing unit 204c) sets the correction amount (the restoration gain or the restoration amount) of the captured image according to the inclination information.

The present invention may be achieved by processing in which a program achieving one or more functions of the above-described exemplary embodiments is supplied to a system or an apparatus through a network or a storage medium, and one or more processors in a computer of the system or the apparatus read and execute the program. Further, the present invention may also be achieved by a circuit (e.g., application specific integrated circuit (ASIC)) achieving one or more functions.

According to the exemplary embodiments, it is possible to provide the image processing method, the image processing apparatus, the imaging apparatus, and the medium capable of performing, on the image obtained by the tilt imaging, the image restoration processing suppressing an adverse effect while reducing the information amount.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM , a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-156780, filed Aug. 15, 2017, which is hereby incorporated by reference herein in its entirety.

What is claimed is:

1. An image processing method, comprising:
acquiring a captured image generated by imaging through an imaging optical system inclined relative to an imaging plane;
acquiring inclination information of the imaging optical system;
acquiring aberration information of the imaging optical system; and
performing image restoration processing on the captured image based on the aberration information,
wherein the image restoration processing includes a setting of a correction amount of the captured image according to the inclination information,
wherein the inclination information includes information relating to an inclination angle of a principle plane of the imaging optical system to the imaging plane,
wherein in the image restoration processing, the correction amount is set to a first correction amount in a case where the inclination angle is a first inclination angle, and the correction amount is set to a second correction amount smaller than the first correction amount in a case where the inclination angle is a second inclination angle larger than the first inclination angle.

2. The image processing method according to claim 1, wherein the correction amount is a restoration gain in the image restoration processing.

3. The image processing method according to claim 1, further comprising acquiring an imaging condition of the captured image,
wherein the aberration information is aberration information corresponding to the imaging condition.

4. The image processing method according to claim 1, wherein the aberration information is aberration information of the imaging optical system in a state where the imaging optical system is not inclined relative to the imaging plane.

5. The image processing method according to claim 1, wherein the aberration information is acquired by rotating and developing aberration information around a center of the captured image or an optical axis of the imaging optical system, the aberration information relating to one direction that passes through the center of the captured image or the optical axis of the imaging optical system and is perpendicular to the optical axis.

6. The image processing method according to claim 1, further comprising creating a filter based on the aberration information,
wherein the image restoration processing includes image restoration processing using the filter.

7. The image processing method according to claim 1, wherein the image restoration processing includes determining the correction amount according to the inclination information and an aperture value in the imaging.

8. The image processing method according to claim 7, wherein, in the image restoration processing, the correction amount is set to a fifth correction amount in a case where the aperture value is a first aperture value, and the correction amount is set to a sixth correction amount smaller than the fifth correction amount in a case where the aperture value is a second aperture value smaller than the first aperture value.

9. The image processing method according to claim 7, wherein, in the image restoration processing, the correction amount is set to a seventh correction amount in a case where the aperture value is equal to a minimum aperture value of the imaging optical system, and the correction amount is set to an eighth correction amount larger than the seventh correction amount in a case where the aperture value is larger than the minimum aperture value of the imaging optical system.

10. The image processing method according to claim 7, wherein, in the image restoration processing, the correction amount is set to a ninth correction amount in a case where the aperture value is larger than a predetermined threshold, and the correction amount is set to a tenth correction amount smaller than the ninth correction amount in a case where the aperture value is equal to or smaller than the predetermined threshold.

11. The image processing method according to claim 1, wherein the aberration information is an optical transfer function of the imaging optical system.

12. The image processing method according to claim 1,
wherein the aberration information is a point spread function of the imaging optical system, and
wherein the image restoration processing includes unsharp mask processing on the captured image with use of the point spread function.

13. An image processing apparatus, comprising:
one or more processor configured to execute a plurality of tasks, the plurality of tasks including:
an image acquisition task that acquires a captured image generated by imaging through an imaging optical system inclined relative to an imaging plane;
an aberration information acquisition task that acquires aberration information of the imaging optical system; and
an image restoration processing task that performs image restoration processing on the captured image based on the aberration information and to acquire inclination information of the imaging optical system,
wherein the image restoration processing task sets a correction amount of the captured image according to the inclination information,
wherein the inclination information includes information relating to an inclination angle of a principle plane of the imaging optical system to the imaging plane,
wherein in the image restoration processing, the correction amount is set to a first correction amount in a case where the inclination angle is a first inclination angle, and the correction amount is set to a second correction amount smaller than the first correction amount in a case where the inclination angle is a second inclination angle larger than the first inclination angle.

14. An imaging apparatus, comprising:

an imaging device configured to photoelectrically convert an optical image formed through an imaging optical system; and an image processor, wherein the image processor is configured to execute a plurality of tasks, the plurality of tasks including:

an image acquisition task that acquires a captured image generated by imaging through the imaging optical system inclined relative to an imaging plane of the imaging device;

an aberration information task that acquires aberration information of the imaging optical system; and an image restoration task that processes image restoration processing on the captured image based on the aberration information and to acquire inclination information of the imaging optical system, wherein the image restoration processing task sets a correction amount of the captured image according to the inclination information, wherein the inclination information includes information relating to an inclination angle of a principle plane of the imaging optical system to the imaging plane, wherein in the image restoration processing, the correction amount is set to a first correction amount in a case where the inclination angle is a first inclination angle, and the correction amount is set to a second correction amount smaller than the first correction amount in a case where the inclination angle is a second inclination angle larger than the first inclination angle.

15. A non-transitory computer-readable storage medium storing a program for causing a computer to execute the image processing method according to claim 1.

* * * * *